United States Patent [19]
Maier

[11] 3,734,954
[45] May 22, 1973

[54] POLYPHOSPHINIC ACIDS AND SALTS THEREOF

[75] Inventor: Ludwig Maier, Zurich, Switzerland

[73] Assignee: Monsanto Company, St. Louis, Mo.

[22] Filed: Aug. 15, 1969

[21] Appl. No.: 850,623

[52] U.S. Cl. ............260/502.4 P, 252/142, 252/152, 260/429.7, 260/429.9, 260/435 R, 260/448 R, 260/927 R, 260/932, 260/969, 260/985
[51] Int. Cl. ............................C07f 9/30, C07f 9/32
[58] Field of Search ........................260/2 P, 502.4 P, 260/501.21, 932, 429.7, 429.9, 435 R, 448 R

[56] References Cited
UNITED STATES PATENTS 3,314,900  4/1967  Uhing....................................260/2 P
3,161,607  12/1964  Garner..................................260/2 P Primary Examiner—Lewis Gotts
Assistant Examiner—Richard L. Raymond
Attorney—James W. Williams, Neal E. Willis, Thomas B. Leslie and Roger R. Jones

[57] ABSTRACT

Polyphosphinic acids and salts thereof of the general formulas

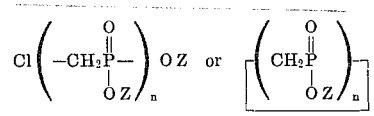

wherein Z is hydrogen, a metal, ammonium or substituted ammonium and $n$ is an integer of at least 2. The polyphosphinic acids are useful as complex-forming agents and sequestering agents. The polyphosphinic acid salts are useful as stabilizers for peroxide solutions and active chlorine compounds.

3 Claims, No Drawings

POLYPHOSPHINIC ACIDS AND SALTS THEREOF

The present invention relates to a process for preparing polyphosphinic acids and salts of the general formulas

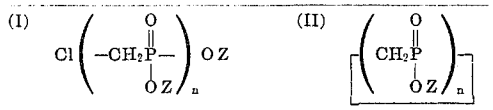

in which Z signifies a hydrogen atom, a metal atom, ammonium or substituted ammonium and $n$ signifies an integer of at least 2.

The process is characterized in that a corresponding chloromethylphosphonous acid diester of the general formula $$ClCH_2P(OR)_2$$

in which R signifies a possibly ethylenically unsaturated and/or substituted aliphatic or cyclodiphatic hydrocarbon group whose chloride RCl is volatile at the reaction temperature, cleavage of RCl is effected by heating in an inert atmosphere, the formed compound is oxidized and the ester groups possibly are converted to hydroxyl groups and the formed polyphosphinic acid possibly is converted to a metal salt.

The process of invention proceeds according to the equations (a)

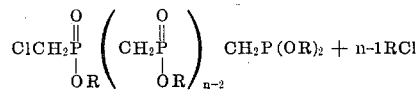

(b)
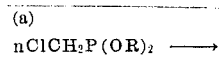

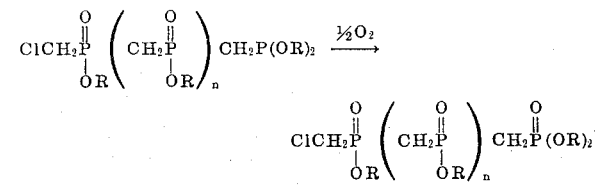

The chloromethylphosphonous acid diester serving as the starting compound is very sensitive towards oxidation because of its trivalent phosphorus atom. The same is true of the terminal phosphonous acid diester grouping in the resulting condensation product. Therefore, the reaction according to equation (a) is expediently carried out in an inert atmosphere in order to avoid formation of chloromethylphosphonic acid diester, because this compound cannot condense further. It is understood by those skilled in the art that for the same reason a premature chain termination can occur by oxidation of the condensation product.

The condensation according to equation (a) is achieved by heating. The temperature is so selected that cleavage of hydrocarbyl halide occurs. The degree of condensation can be estimated by determining the amount of RCl split off. It is understood that at higher temperature this cleavage and consequently the condensation proceeds faster. Of course, the facility of the cleavage of RCl also depends on the kind of the organic group R. When higher boiling hydrocarbyl halides have to be split off, the heating can be carried out also under reduced pressure. The upper temperature limit is defined by further decomposition which can be detected by the formation of other fragments than the expected hydrocarbyl halides. It is clear that about the same molecular weight may be reached, either by longer heating at lower temperature, or by relatively short heating at relatively high temperature. However, thereby, the molecular weight distribution is, as a rule, different as is known from other condensation reactions.

The oxidation according to equation (b) can be achieved by any oxygen releasing agent. Even contact with air is sufficient.

As is apparent from the reaction equation (a), apart from the cleavage of RCl also a rearrangement (Michaelis-Arbuzov rearrangement) occurs. It is known that this rearrangement is feasible only with aliphatic and cycloaliphatic ester groups. Consequently the group R is a straight chain or branched alkyl having one to 24 carbon atoms, a cycloalkyl having five to 12 carbon atoms or an arylated alkyl of the above cited kind.

The hydrolysis of the ester groups is expediently carried out with a mineral acid, preferably concentrated hydrochloric acid. Upon heating with concentrated hydrochloric acid for several hours the corresponding polyphosphinic acid

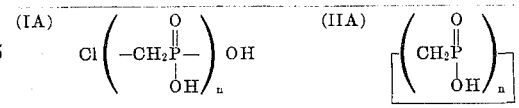

is obtained in quantitative yield. The polyphosphinic acid remains after removal of the hydrochloric acid as a residue. The oxidation according to equation (b) can simultaneously be carried out by hydrolysis in the presence of oxygen.

If the esters will not be used as such but the corresponding acid, the R group will be so selected that it is easily cleavable. In general, the easily available methyl ester, ethyl ester or propyl ester, whose chlorides are quite volatile will be employed.

The thermal decomposition of corresponding isopropyl esters has been found to be an especially advantageous preparation of the acids. At about 190° C. propylene is released quantitatively, whereby the acid is obtained quantitatively. On using this process the preparation of the isopropyl ester is carried out by heating of chloromethylphosphonous acid diisopropyl ester at a temperature at which propylene is not split off. As a rule, it can be heated at about 170° C. until cleavage of the desired quantity of isopropyl chloride is complete, i.e. the desired degree of condensation is reached.

If desired the esters can also be cleaved only partially. This is achieved expediently by hydrolysis with the calculated amount of a solution of caustic soda or potash. The corresponding alkali salts are obtained upon evaporation. The free acids are then being produced by treating with an ion exchange resin in known manner.

The conversion to the corresponding metal salts, ammonium salts or substituted ammonium salts can be performed using known methods. Under the term "substituted ammonium salts," herein are comprised corresponding salts of any primary, secondary or tertiary amines. For example ethanol amines, diethanol amines and triethanol amines, as well as their condensation products with ethylene oxide as utilized in the detergent manufacture, will be included. The amine salt may be water soluble to water insoluble. Salts of pronounced basic amines such as alkylamines, piperidine, morpholine etc. are easily soluble. Salts with aromatic amines such as aniline, naphthylamine, diphenylamine etc. may be scarcely soluble to insoluble. Alkali salts can be obtained by simple neutralization with corresponding alkalis. These are very soluble in water. Alkaline earth salts can also be prepared in this way. For example, calcium carbonate can easily be decomposed because of the strong acidic character of the polyphosphinic acids. Other metal salts like, e.g., tin salts, zinc salts, aluminum salts, lead salts etc. can be obtained in known manner by reaction of the alkali polyphosphinates with corresponding metal halides. The corresponding metal salts can also be obtained by heating with metal halides until the evolution of hydrochloric acid is finished, because the polyphosphinic acids are extraordinarily stable toward acid hydrolysis. It is understood that for salt formation, as a rule, stoichiometric quantities of the reactants will be employed.

The esters (Z = R) obtainable in the first reaction step have not been known previously. According to the nature of the organic group R they possess a solid to waxy consistence. The polyphosphinic acid esters are useful as additives to detergents, as dry cleaning agents in organic solvents, additives to gasoline and lubricants, as well as flameproofing agents.

The acids are suited for additives to detergents especially in the form of sodium or potassium salts. They display a great complexing power for calcium, magnesium, iron, copper and many other metal ions. In this respect, they are superior in comparison to well known complexing agents used at present. Innumerable detergent compositions have been described containing as complexing agents sodium tripolyphosphate, sodium hexametaphosphate, trisodium nitrilotriacetate, hexasodium nitrilotrimethylenephosphonate, tetrasodium methylenediphosphonate, tetrasodium-1-hydroxyethylidene-1.1-diphosphonate etc. Such complex-forming compounds can be replaced completely or partially by the compounds of invention. Moreover, the thermal and in some cases also the hydrolytic stability is essentially greater as compared to the complexing agents used up to now in detergents.

Other useful applications are found in, for example, the book ORGANIC SEQUESTRING AGENTS, John Wiley and Sons, 1959.

EXAMPLE 1

To 79.4 g (0.525 mol) of $ClCH_2PCl_2$ in 400 ml of anhydrous ether is slowly added a mixture of 48.4 g (1.05 mols) of anhydrous ethyl alcohol and 106.2 g (1.05 mols) of triethyl amine at 0° C. in a nitrogen atmosphere. The reaction mixture is subsequently stirred for 1 hour and the triethylamine chlorohydrate is filtered off under nitrogen. After removal of the solvent there remains quantitatively crude chloromethylphosphonous acid diethylester. Upon fractional distillation there are obtained 24.7 g (27.6 percent) of a compound, b.p. 73°–77° C./20 mm, as a clear liquid. The compound is very sensitive to oxygen and moisture. It becomes hot on standing in contact with air and begins to fume.

In the $^1H$ – NMR spectrum the following peaks are observable:

$CH_3$ at 1.35 δ ($J_{HH}$7 Hz, $J_{POCCH}$12 Hz; calc'd 6 H, found 6 H);
$ClCH_2$ at 3.33 δ ($J_{PCH}$ 8 Hz; calc'd 2 H, found 2 H); and
$OCH_2$ at 3.33 to 4.5 δ (multiplet; calc'd 4 H, found 4.04 H).

20.1 g of the chloromethylphosphonous acid diethylester are heated under nitrogen at 170° C. for 7 hours. Ethyl chloride (4.4 g) distills from the reaction mixture. The product becomes solid on cooling. It is purified by reprecipitation in alcohol/ether at −20° C. in contact with air in order to oxidize the terminal phosphonite group. The product occurring first as an oil becomes solid on drying in a high vacuum, m.p. 70°–90° C.

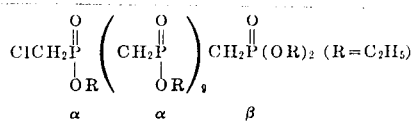

The $^1H$ and $^{31}P$ spectra confirm the stated structure. The $ClCH_2$ group is taken as a standard for the determination of the chain length.

$^1H$—NMR $CH_3$ at 1.33 δ ($J_{HH}$7 Hz, calc'd 36 H, found 37 H);
$PCH_2P$ at 2.17 to 3.58 δ (calc'd 20 H, found 23 H);
$ClCH_2$ at 3.67 δ $J_{PCH}$6.5 Hz, (calc'd 2 H, found 2 H);
and $OCH_2$ at 4.2 δ (calc'd 24 H, found 24.5 H).

$^{31}P$—NMR $P_\alpha$ —37.7 ppm, $P_\beta$ —17.0 ppm, $\alpha : \beta = \sim 10 : 1$ For the conversion to the corresponding acid, 10 g of the ester are refluxed with 20 ml concentrated HCl. First the solution is clear and becomes milky after 2 hours. After 40 hours reflux the mixture is completely concentrated by evaporation and in order to remove the last traces of HCl there is added isopropyl alcohol and evaporated again. This procedure is repeated three times. The acid is obtained as a solid in quantitative yield; m.p. 295°–320° C. The titration with sodium hydroxyde solution shows an equivalent weight of 80.8 (theory 76.3).

The $^1H$ — and $^{31}P$ — NMR spectra in $D_2O$ confirm the stated structure of the sodium salt.

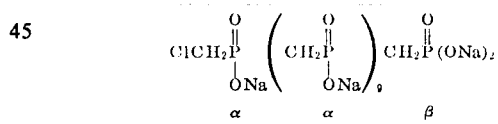

$^1H$ — NMR $PCH_2P$ at 2.78 δ (broad triplet, $J_{PCH}$15.5 Hz), $ClCH_2$ at 4.11 δ (doublet $J_{PCH}$6 Hz).

$^{31}P{-NMR}$ $P_\alpha$ —29.1 ppm, $P_\beta$ —16.5 ppm, $\alpha : \beta= \sim 10 : 1$ The calcium sequestering ability of this polyphosphinic acid is compared with some of the best complexing agents used up to now. 0.25 g of the compound in form of the sodium salt and 0.25 g of sodium oxalate are dissolved in 250 ml of water, the pH is adjusted with a solution of sodium hydroxide to 10, and the solution is titrated at 25° C. using a 0.1 molar solution of calcium nitrate until the cloud point is reached. In order to calculate the amount in g of calcium which is sequestered by 100 g of the compound tested, the volume of 0.1 M $Ca(NO_3)_2$ solution consumed, in ml units, is multiplied by 1.6.

| Complexing Agent | Sequestering Ability g Ca per 100 g of Complexing Agent |
|---|---|
| Polyphosphinic acid | 11.5 |
| Nitrilotrimethylene-phosphonic acid | 9.1 |
| 1-Hydroxyethylidene-1, 1-diphosphonic acid | 8.1 |

In general the addition amounts to about 10 to 90 weight-percent of the detergent composition, while the application concentration amounts to about 0.1 to 5 g per liter at a pH of about 8 to 12. However, the phosphinic acid can be adjusted to be neutral and thus be used for washing delicate fabrics. Further, the polyphosphinic acid is also suitable in acidic baths for cleaning and treating apparatus parts, tubings, metals etc., because it is extremely resistant towards acid hydrolysis, as is already apparent from the preparation. Therefore, it can be used together with other acids such as nitric acid, sulfuric acid, hydrochloric acid, chromic acid etc. and it is compatible with the usual anticorrosion inhibitors.

The influence of the above described polyphosphinic acid on washing power is determined by comparison to tripolyphosphate. Standard soiled test clothes are washed under carefully controlled identical conditions at 60° C. and pH 9.5 in a Launder-O-Meter. The following detergent compositions in aqueous solution of the indicated concentration are used:

|  | g/Liter |
|---|---|
| Sodium Dodecylbenzenesulfonate | 0.4 |
| Complexing Agent | 1.0 |
| Sodium Silicate | 0.2 |
| Sodium Carboxymethylcellulose | 0.007 |

| Complexing Agent | % Soil Removal |
|---|---|
| Sodium Polyphosphinate | 52 |
| Sodium Polyphosphate | 42 |
| Without Complexing Agent | 17 |

It is apparent from the Table that the complexing agent of this invention is superior to the widely used sodium tripolyphosphate.

EXAMPLE 2

To 15.9 g (0.105 mol) of $ClCH_2PCl_2$ in 80 ml of anhydrous ether there is slowly added a mixture of 15 g (0.211 mol) of butyl alcohol and 21.2 g (0.211 mol) of triethylamine at 0° C. in a nitrogen atmosphere. The reaction mixture is subsequently stirred for 1 hour and the triethylamine is filtered off under nitrogen. After removal of the solvent crude chloromethylphosphonous acid dibutylester remains quantitatively. Upon distillation there is obtained the pure compound; b.p. 85°–90° C./5 mm. The compound is extremely sensitive to oxygen and humidity.

$^1H - NMR$ $C_3H_7$ at 0.72 to 2.0 δ (broad, calc'd 14 H, found 14 H); $ClCH_2$ at 3.33 δ ($J_{PCH}$8.2 Hz, calc'd 2 H, found 1.94 H); and $POCH_2$ at 3.9 δ (broad, calc'd 4 H, found 4.1 H).

1.5 g of the chloromethylphosphonous acid dibutylester are heated at 170° C. for 4 hours. Butyl chloride is split off and a waxy product is obtained.

$^1H - NMR$ $C_3H_7$ at 0.7 to 2.0 δ (multiplet, calc'd 42 H, found 40.8 H); $PCH_2P$ at 2.93 δ (broad triplet, $J_{PCH}$17.5 Hz, calc'd 8 H, found 9.4 H); $ClCH_2$ at 3.7 δ (doublet, $J_{PCH}$8.5 Hz, calc'd 2 H, found 2 H); and $POCH_2$ at 4.13 δ (calc'd 12 H, found 12.4 H).

From this analysis it is evident that $n = 5$ with respect to formula I set forth above.

Upon further heating at 170° C. for 2 hours the corresponding ester having $n = 6$ is obtained.

$^1H - NMR$ $C_3H_7$ at 0.72 to 2.0 δ (broad, calc'd 49 H, found 46.3 H); $PCH_2P$ at 2.95 δ (broad triplet, $J_{PCH}$18 Hz, calc'd 10 H, found 11.3 H); $ClCH_2$ at 3.7 δ (doublet, $J_{PCH}$8.5 Hz, calc'd 2 H, found 2 H); and $POCH_2$ at 4.13 δ (broad, calc'd 14 H, found 13 H).

Further heating at 170° C. for 7 hours yields a white powder which no longer shows a peak for a $ClCH_2$ group in the $^1H$ NMR spectrum. Consequently the ester possesses the ring structure (II) or a high polymeric structure (I) where $n$ represents a relatively great number.

By hydrolyzing with concentrated hydrochloric acid in contact with air, as discussed in Example 1, there are obtained the corresponding acids from the three esters cited above.

The new compounds in the form of their water soluble salts are suitable stabilizers for peroxide solutions such as hydroperoxide solutions and solutions of adducts thereof such as sodium superoxide, potassium superoxide, sodium perborate, urea peroxide; also, for peracids such as persulfuric acid, peracetic acid, peroxymonophosphoric acid and water soluble salts thereof such as the sodium, potassium, ammonium and amine salts. In general, such aqueous solutions show a pH of between 7.5 and 12.5 in order to produce a favorable bleaching effect. The adjustment of the pH value is achieved in known manner using inorganic compounds like alkali hydroxides, alkali carbonates, alkali silicates, di- and trialkaliphosphates, di-, and tri- and tetraalkalipyrophosphates and the like. According to the kind of peroxy compound, pH, temperature and material to be bleached, the concentration of the stabilizer will lie between about 0.01 and 4 percent, preferably between about 0.2 and 3 percent. The new compounds can also be used for the stabilization of concentrated hydrogen superoxide, for example, a commercial hydrogen superoxide solution of 30 to 35 percent.

Moreover, the new compounds serve to stabilize active chlorine compounds such as alkyl hypochlorites, N-chlorohydantoin, N-chlorosuccinic acid imide, N-chlorophthalic acid imide, trichloroisocyanuric acid, dichloroisocyanuric acid, sodium dichloroisocyanurate, potassium dichloroisocyanurate, polychloroisocyanurate complexes, sodium benzenesulfochloramide, sodium nitrobenzenesulfochloramide, sodium-p-toluenesulfochloramide, chlorinated trisodium phosphate, and the like. The amount of the stabilizer, i.e. the amount of the compounds of invention which can be employed for the stabilization of such chlorine releasing solutions, will lie between 0.1 to 5 g per liter.

I claim:

1. Polyphosphinic acids and salts of the general formulas

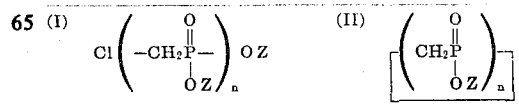

in which Z signifies a hydrogen atom, a metal atom, ammonium or substituted ammonium and $n$ stands for an integer of 2 to about 10.

2. Salts of polyphosphinic acids according to claim 1 wherein Z is a sodium or potassium atom.

3. Polyphosphinic acids according to claim 1 of Formula I wherein Z represents hydrogen.

\* \* \* \* \*

PO-1050
(5/69)

UNITED STATES PATENT OFFICE
CERTIFICATE OF CORRECTION

Patent No. 3,734,954    Dated May 22, 1973

Inventor(s) Ludwig Maier

It is certified that error appears in the above-identified patent and that said Letters Patent are hereby corrected as shown below:

On the cover sheet insert -- [30] Foreign Application Priority Data    Switzerland    16304/68    Oct. 21, 1968 --.

Col. 6, line 43, "4 percent" should be -- 5 percent --.

Signed and sealed this 19th day of November 1974.

(SEAL)
Attest:

McCOY M. GIBSON JR.
Attesting Officer

C. MARSHALL DANN
Commissioner of Patents